US006862768B2

(12) United States Patent
Hutton

(10) Patent No.: US 6,862,768 B2
(45) Date of Patent: Mar. 8, 2005

(54) OVERHEAD ADJUSTABLE SUPPORT SYSTEM FOR A PASSENGER BOARDING BRIDGE

(75) Inventor: Neil Hutton, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/382,493

(22) Filed: Mar. 7, 2003

(65) Prior Publication Data

US 2004/0172776 A1 Sep. 9, 2004

(51) Int. Cl.[7] .................................................. E01D 1/00

(52) U.S. Cl. ........................................ 14/71.5; 14/71.3

(58) Field of Search ................................ 14/69.5, 71.3, 14/71.5

(56) References Cited

U.S. PATENT DOCUMENTS

| | | | | |
|---|---|---|---|---|
| 2,700,169 A | * | 1/1955 | Henion | 14/71.5 |
| 3,145,854 A | * | 8/1964 | Sturm et al. | 14/71.1 |
| 3,538,529 A | | 11/1970 | Breier | |
| 3,722,017 A | | 3/1973 | Gacs et al. | |
| 3,793,662 A | * | 2/1974 | Gacs et al. | 14/71.5 |
| 3,953,980 A | * | 5/1976 | Bennett | 405/221 |
| 4,169,296 A | * | 10/1979 | Wipkink et al. | 14/71.1 |
| 4,990,029 A | * | 2/1991 | Hemminger | 405/203 |
| D327,951 S | | 7/1992 | Anderberg | |
| 6,496,996 B1 | * | 12/2002 | Worpenberg et al. | 14/71.5 |
| 6,526,615 B1 | * | 3/2003 | Hutton et al. | 14/71.5 |

FOREIGN PATENT DOCUMENTS

| | | |
|---|---|---|
| DE | 100 46 010 A1 | 3/2002 |
| WO | WO 00/09395 A2 | 2/2000 |

OTHER PUBLICATIONS

"Dual bridges may shorten Southwest's turnaround" Dallas Business Journal, May 22, 2000.
"Easy come, easy go" AE & T Autumn 2001, pp 3–5.

(List continued on next page.)

*Primary Examiner*—Gary S. Hartmann
(74) *Attorney, Agent, or Firm*—Freedman & Associates

(57) ABSTRACT

Disclosed is an overhead adjustable support system for use with an aircraft passenger boarding bridge, and especially for use with an aircraft passenger boarding bridge having at least two tunnel sections disposed one each on opposite sides of a flexible connection. A preferred embodiment of the overhead adjustable support system includes a first support member for being mounted to one of the at least two tunnel sections at a first point proximate the flexible connection. The first support member also has a free end for being disposed elevationally above the one of the at least two tunnel sections. The overhead adjustable support system also includes a second support member for being mounted to the other one of the at least two tunnel sections at a second point proximate the flexible connection, and has a free end for being disposed elevationally above the other one of the at least two tunnel sections. In addition, the overhead adjustable support system includes at least a lift mechanism having a first end and a second end opposite the first end, a distance between the first end and the second end being controllably variable. The at least a lift mechanism is in hinged communication at the first end thereof with the free end of the first support member and in hinged communication at the second end thereof with the free end of the second support member. During use, varying the distance between the first end and the second end of the at least a lift mechanism effects a change to the orientation of the at least two tunnel sections relative to the flexible connection so as to vertically swing one of the at least two tunnel sections relative to the other one of the at least two tunnel sections about a horizontal axis aligned with the flexible connection.

13 Claims, 6 Drawing Sheets

OTHER PUBLICATIONS

Fabriksmonteringin Trelleborg AB website: http://www.fmt.se (pages of particular relevance attached).

Information relating to possible public use (see attached photos).

"Southwest Takes Back Door to Beat Deplaning Record" Texas Journal, date unknown.

"Southwest Tests First Narrowbody Dual Boarding Bridges" Business Week Daily, date unknown.

"Southwest tests twin loading system: airline trying dual boarding of passengers at Love Field" Star–Telegram—Mar. 7, 2000.

* cited by examiner

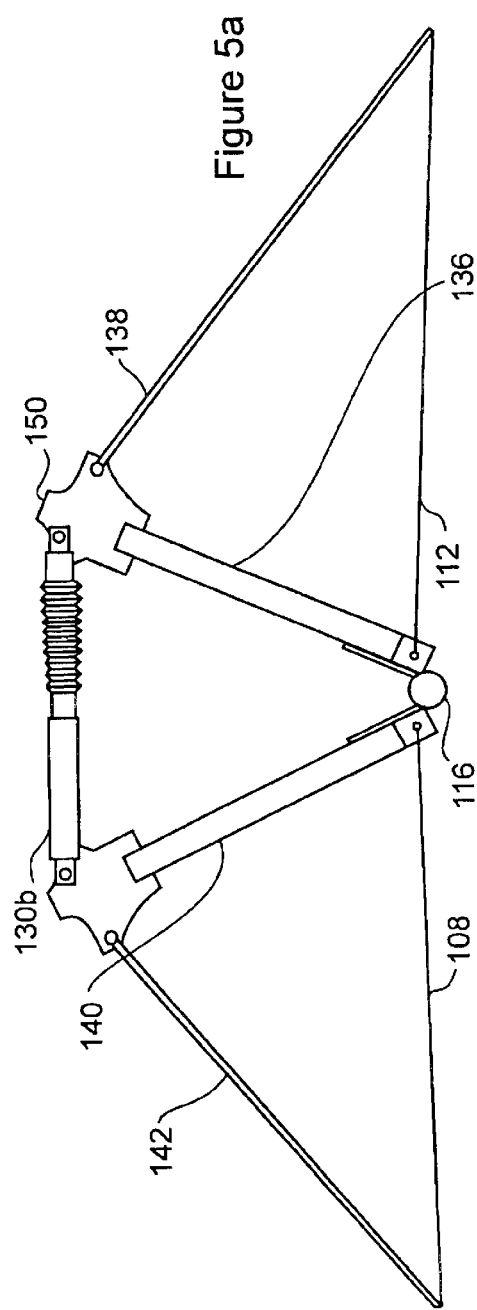
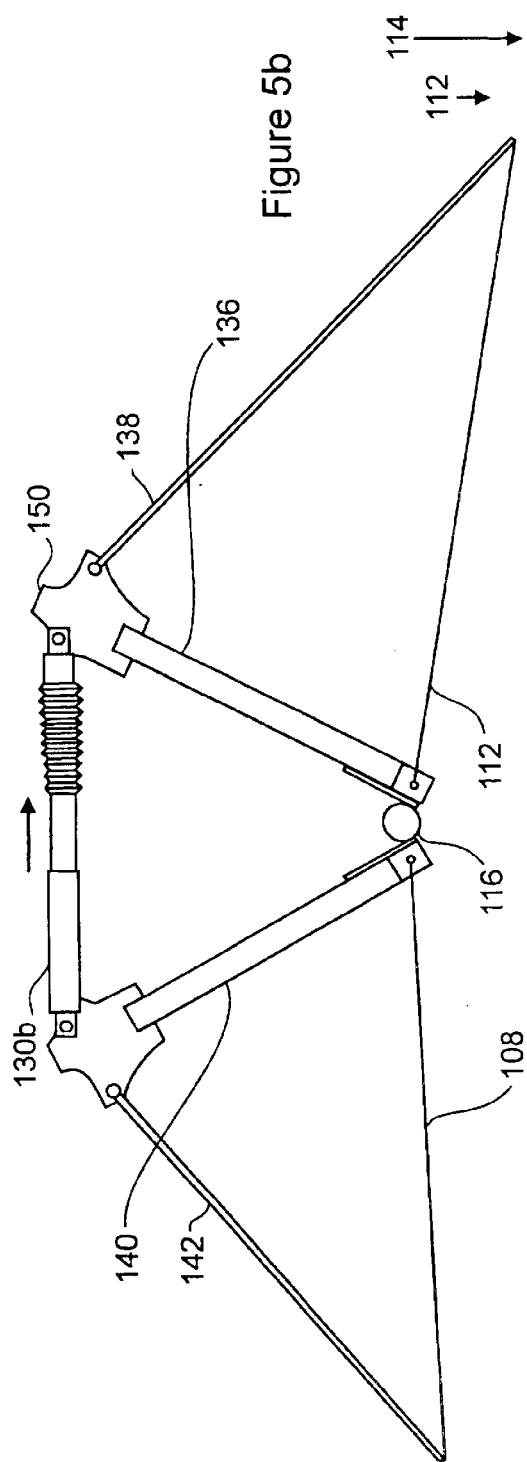

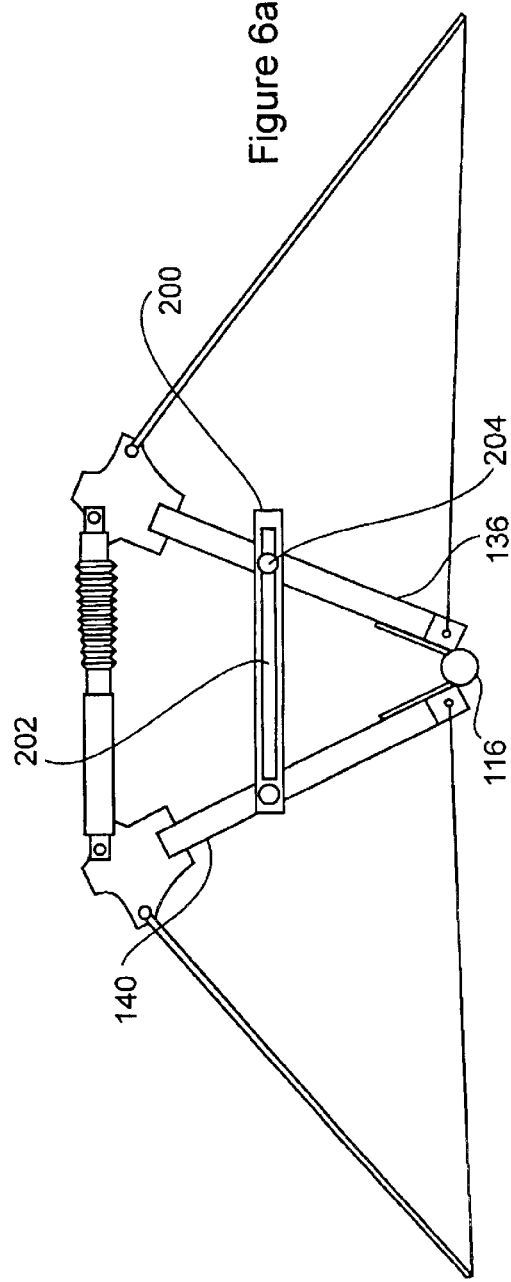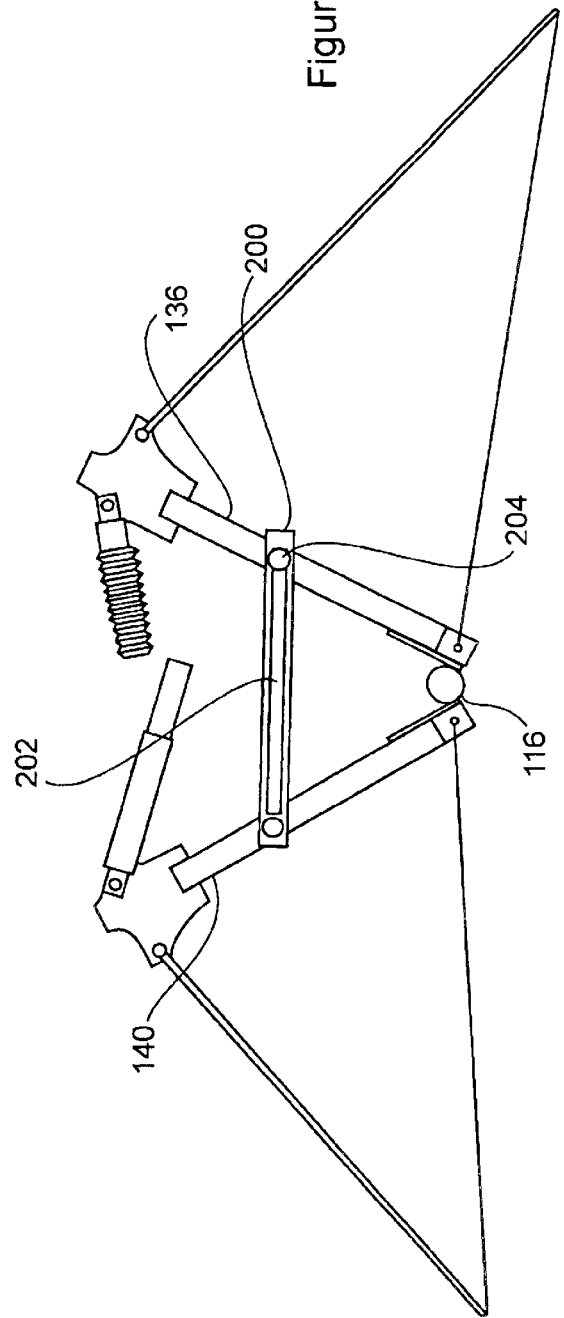

OVERHEAD ADJUSTABLE SUPPORT SYSTEM FOR A PASSENGER BOARDING BRIDGE

FIELD OF THE INVENTION

The instant invention relates generally to an overhead adjustable support system for a passenger boarding bridge and more particularly to an overhead adjustable support system for a flexible over-the-wing passenger boarding bridge.

BACKGROUND OF THE INVENTION

Over-the-wing passenger boarding bridges for servicing aircraft doorways located above or behind the wing are known in the art (U.S. Pat. No. 6,496,996, DE 10046010, WO 0009395, U.S. Pat. Nos. 3,538,529, 3,722,017). Each prior art solution provides a tunnel section that is supported in a cantilever-like fashion by an overhead support system, such that the tunnel section is positionable over the wing of the aircraft for engaging a rear doorway that is located behind the wing. To this end, the tunnel section typically includes at least a telescopic portion including a cab mounted at an outboard end thereof, the cab for being aligned with the rear doorway. Unfortunately, the length of the tunnel section that must be supported often is considerable, especially for bridges that are designed to engage a rear doorway of a larger aircraft or of a "stretch" model of some smaller types of aircraft. Of course, an overhead adjustable support system must be capable not only of supporting the entire weight of the tunnel section, but also the weight of passengers moving through the tunnel section, the weight of service equipment mounted to the tunnel section, and the weight of snow and ice accumulated on external surfaces of the tunnel section. Furthermore, the overhead adjustable support system must maintain the tunnel section approximately stationary during use, so as to avoid jostling passengers or allowing the tunnel section to collide with a surface of the aircraft. Further still, the overhead adjustable support system must be capable of moving precisely the tunnel section to a desired stopping position when the tunnel section is being aligned with the rear doorway of the aircraft.

In U.S. Pat. No. 6,496,996, issued to Worpenberg and Scharf on Dec. 24, 2002, an overhead adjustable support system is provided including a frame which surrounds the tunnel section and which is pivotably mounted to a massive post that is permanently secured to the apron. An extension arm is rigidly or moveably fastened to the frame, and the telescoping tunnel elements of the tunnel section are suspended in a height-adjustable manner from the extension arm. It is a limitation of the system that is disclosed in U.S. Pat. No. 6,496,996 that the extension arm requires a massive counterweight, which could at times be positioned above portions of the passenger boarding bridge, as well as massive lift cylinders in order to support the tunnel section in the height adjustable manner. Accordingly, the system is expensive to implement, provides limited flexibility and requires construction of permanent support structures on the apron surface for supporting the frame.

In DE 10046010, disclosed is an over-the-wing bridge including a telescoping tunnel section that is pivotally mounted to an outboard end of a radial bridge. An overhead adjustable support system is provided including an elaborate assembly of support rods, which is disposed both above and below portions of the telescoping tunnel section and the radial bridge, for supporting the telescoping tunnel section in a height adjustable manner. To this end, lift columns are provided for adjusting the level of the telescoping tunnel section relative to that of the radial bridge. In fact, the support system for the telescoping tunnel section appears to be an extension of a main elevating member of the radial bridge. The system described in DE 10046010 not only is awkward and expensive, but also appears to support only limited vertical adjustment of the outboard end of the telescoping tunnel section. Furthermore, horizontal adjustment of the outboard end of the telescoping tunnel section appears to be severely limited as a result of some of the support rods extending between the main elevating member of the radial bridge.

In WO 0009395, an overhead adjustable support system is provided in the form of a massive, horizontally pivotal extension arm which is mounted on a support. An opposite end of the extension arm carries a counterweight, which could at times be positioned above portions of the passenger boarding bridge. Unfortunately, the sheer size of the extension arm necessitates the construction of an equally massive support, including plural support posts surrounding the passenger boarding bridge and permanently secured to the apron. Accordingly, the system that is disclosed in WO0009395 is both expensive and awkward.

U.S. Pat. No. 3,538,529 issued to Breier on Nov. 10, 1970 discloses an overhead supported aircraft boarding bridge, including a slightly arched telescoping tunnel section, which may be cantilevered over the wing of an aircraft for servicing a rear doorway thereof. The entire telescoping tunnel section is pivotally connected to a static structure, thereby providing limited freedom of vertical motion for clearing the wing and mating to the rear doorway of the aircraft. In particular, the overhead supported boarding bridge is supported by a cantilevered structure which extends out from the static structure to support a track which extends above and generally transversely or arcuately to the tunnel section of the bridge. A carriage rides on the track and supports the tunnel section by vertically extensible supports. Operation of the carriage along the track effects horizontal swinging of the tunnel section about its pivoted inner end and actuation of the vertically extensible supports effects vertical swinging of the tunnel section. Unfortunately, this system is complicated, provides limited flexibility and is expensive.

U.S. Pat. No. 3,722,017 issued to Gacs et al. on Mar. 27, 1973 discloses an over-the-wing aircraft boarding bridge having a main passageway member pivotally supported at the terminal building end on a track mounted rack propelled carriage. The main passageway member is elevatable and depressable so that its outer end portion, slightly arched, may extend over the wing of an aircraft. At its outer end the main passageway mounts a lateral passageway including an operator's cab, which is for being mated to a rear doorway of the aircraft. The lateral passageway appears to serve as a bridge between the rear doorway and the main passageway element, which passageway lacks sufficient freedom of vertical movement to engage the rear doorway directly. This system also is complicated, provides limited flexibility and is expensive.

None of the prior art solutions provides a desirable balance between safety concerns, simplicity of construction, ease of operation and flexibility to service aircraft of different types. It would therefore be advantageous to provide an overhead adjustable support system for use with a passenger boarding bridge. It would be particularly advantageous to provide an overhead adjustable support system for use with an over-the-wing passenger boarding bridge that overcomes the above-mentioned disadvantages associated with the prior art.

SUMMARY OF THE INVENTION

In accordance with an aspect of the instant invention there is provided an overhead adjustable support system for use with an aircraft passenger boarding bridge, the aircraft passenger boarding bridge including at least two tunnel sections disposed one each on opposite sides of a flexible connection, the flexible connection for supporting a vertical swinging motion of one of the at least two tunnel sections relative to the other one of the at least two tunnel sections, the overhead adjustable support system comprising: a first support member for being mounted to one of the at least two tunnel sections at a first point proximate the flexible connection, and having a free end for being disposed elevationally above the one of the at least two tunnel sections; a second support member for being mounted to the other one of the at least two tunnel sections at a second point proximate the flexible connection, and having a free end for being disposed elevationally above the other one of the at least two tunnel sections; and, at least a lift mechanism having a first end and a second end opposite the first end, a distance between the first end and the second end being controllably variable, the at least a lift mechanism in hinged communication at the first end thereof with the free end of the first support member and in hinged communication at the second end thereof with the free end of the second support member, whereby varying the distance between the first end and the second end of the at least a lift mechanism effects a change to the orientation of the at least two tunnel sections relative to the flexible connection so as to vertically swing one of the at least two tunnel sections relative to the other one of the at least two tunnel sections about a horizontal axis aligned with the flexible connection.

In accordance with an aspect of the instant invention there is provided an overhead adjustable support system for use with an aircraft passenger boarding bridge, the aircraft passenger boarding bridge including at least two tunnel sections disposed one each on opposite sides of a flexible connection, the flexible connection for supporting a vertical swinging motion of one of the at least two tunnel sections relative to the other one of the at least two tunnel sections, the overhead adjustable support system comprising: at least a lift mechanism having a first end and a second end that is opposite the first end, a distance between the first end and the second end being controllably variable, the at least a lift mechanism for being disposed elevationally above a flexible connection of a passenger boarding bridge; a first support member for being disposed between the first end of the at least a lift mechanism and one of the at least two tunnel sections; and, a second support member for being disposed between the second end of the at least a lift mechanism and the other one of the at least two tunnel sections.

In accordance with an aspect of the instant invention there is provided an overhead adjustable support system for use with an aircraft passenger boarding bridge, the aircraft passenger boarding bridge including at least two tunnel sections disposed one each on opposite sides of a flexible connection, the flexible connection for supporting a vertical swinging motion of one of the at least two tunnel sections relative to the other one of the at least two tunnel sections, the overhead adjustable support system comprising at least a lift mechanism having a first end and a second end that is opposite the first end, a distance between the first end and the second end being controllably variable, the first end of the at least a lift mechanism in hinged communication with one of the two tunnel sections proximate an end thereof and the second end of the at least a lift mechanism in mechanical communication with the other one of the two tunnel sections proximate an end thereof, the end of the one of the two tunnel sections and the end of the other one of the two tunnel sections being disposed in a facing arrangement one each on opposite sides of a flexible floor connection of a passenger boarding bridge.

BRIEF DESCRIPTION OF THE DRAWINGS

Exemplary embodiments of the invention will now be described in conjunction with the following drawings, in which similar reference numbers designate similar items:

FIG. 5a is a simplified schematic side view of the overhead adjustable support when the lift mechanism is approximately fully retracted;

FIG. 5b is a simplified schematic side view of the overhead adjustable support when the lift mechanism is extended;

FIG. 6a is a simplified schematic side view of the overhead adjustable support including a mechanical stop;

FIG. 6b is a simplified schematic side view of the overhead adjustable support including a mechanical stop after a catastrophic failure of the lift mechanism; and, FIG. 7 is a partial side view of an over-the-wing passenger boarding bridge including another overhead adjustable support according to the instant invention.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. Throughout the detailed description and in the claims, it is to be understood that the following definitions shall be accorded to the following terms. The term 'inboard end' refers to that end of a passageway nearest a stationary structure, for instance one of a terminal building and a stationary rotunda. The term 'outboard end' refers to that end of a passageway nearest an aircraft doorway.

Figure 1:
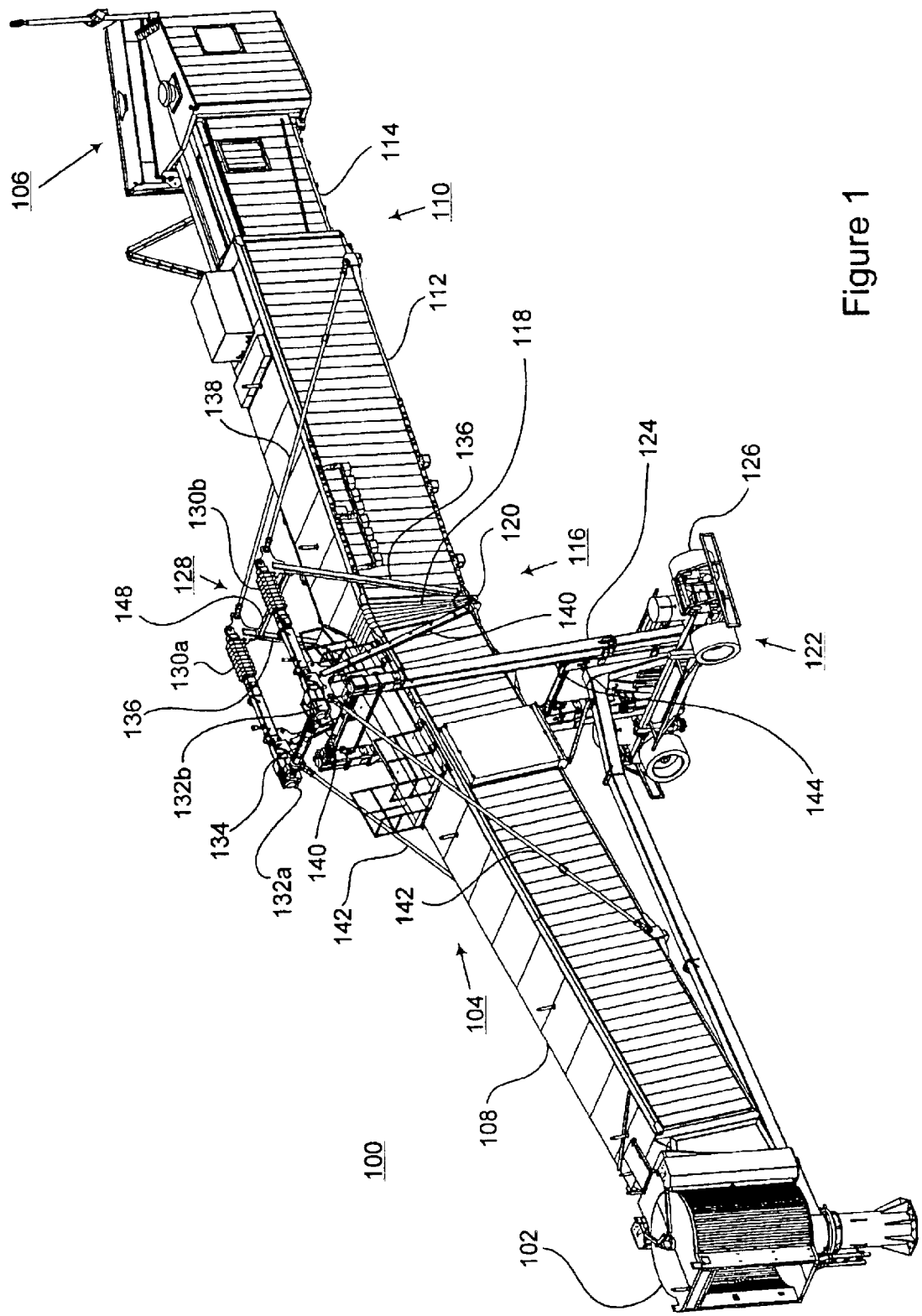
FIG. 1 is a side elevational view of an over-the-wing passenger boarding bridge including an overhead adjustable support according to the instant invention.

Referring to FIG. 1, shown is a side elevational view of an over-the-wing passenger boarding bridge including an overhead adjustable support according to the instant invention. The passenger boarding bridge, shown generally at 100, extends from a support, such as for example a stationary rotunda 102. A passageway 104, ending with a pivotal cabin 106 for mating to a not illustrated rear doorway of a not illustrated aircraft, extends from the support. The passageway 104 comprises a fixed-length first passageway member 108 and a telescopic tunnel section 110. The fixed-length first passageway member 108 preferably includes a floor, two sidewalls and a ceiling. The telescopic tunnel section 110 includes outer and inner tunnel elements 112 and 114, respectively, wherein the inner element 114 is telescopically received within the outer element 112 such that the length of the tunnel section 110 is variable. Each tunnel element 112 and 114 preferably includes a floor, two sidewalls and a ceiling. Preferably, the fixed-length first passageway member 108 and the outer tunnel element 112 have substantially similar cross-sectional profiles when viewed end-on. A flexible connection 116 including a bellows-type canopy 118 and a floor connector 120 connects the outboard end of the first passageway member 108 and the inboard end of the outer tunnel element 112. For instance, a hinge is provided between the outboard end of the first passageway member 108 and the inboard end of the outer tunnel element 112, for pivotally mounting one to the other. The bellows-type canopy 118 is provided between the first passageway member 108 and the outer tunnel element 112 to provide weatherproof protection to passengers passing therebetween. Optionally, the flexible connection 116 includes a floor plate (not shown) to provide a level surface over which passengers move through the bridge. The flexible connection 116 supports a vertical swinging motion of the telescopic tunnel section 110 about a horizontal axis aligned with the floor connector 116, for instance a pivoting motion about the hinge.

The boarding bridge 100 is for being cantilevered and extended over a not illustrated wing of a not illustrated nose-in parked aircraft, so as to service a rear doorway thereof. Accordingly, an inboard end of the first passageway member 108 is pivotally mounted to the stationary rotunda 102, preferably being at more or less the same elevation as the doorways along the lateral surface of the not illustrated aircraft. The first passageway member 108 is supported near the outboard end thereof by a wheel carriage 122 including a height adjustable support post 124 and drive wheels 126. The drive wheels 126 are for achieving angular displacement of the passageway 104. Additional mechanisms (not shown) are provided for slidingly extending and retracting the inner tunnel element 114 relative to the outer tunnel element 112, to thereby affect the length of the passageway 104, and for pivoting the pivotal cabin 106. The height adjustable support post 124 preferably includes one of a hydraulic cylinder, a pneumatic cylinder and a ball-screw jack. Of course, other known mechanisms for moving the various bridge components relative to other bridge components are envisaged for use with the instant invention. Preferably, the height adjustable support posts 124 are mounted at a point along the length of the first passageway member 108 that is between approximately 10 feet and approximately 3 feet from the outboard end of the first passageway member 108. Most preferably, the height adjustable support posts 124 are mounted at a point along the length of the first passageway member 108 that is between approximately 8 feet and approximately 4 feet from the outboard end of the first passageway member 108. Mounting the height adjustable support posts 124 at a point distal from the outboard end of the first passageway member advantageously allows the wing of the aircraft to approach more closely to the flexible connection, absent any obstacles such as for instance one of a support post and a bridge supporting pedestal.

An overhead adjustable support system 128 according to the instant invention is provided for supporting the telescopic tunnel section 110 relative to the first passageway member 108. The overhead adjustable support system 128 supports a controlled vertical swinging motion of an outboard end of the telescopic tunnel section 110 relative to an inboard end of the telescopic tunnel section 110, about a horizontal axis aligned with the floor connector 116. In a preferred embodiment, the overhead support system 128 includes two lift mechanisms 130a, 130b for being supported relative to a passenger boarding bridge 100 as shown in FIG. 1. For example, the lift mechanisms are selected from a group comprising: electromechanical screws; hydraulic cylinders; and, pneumatic cylinders. The electromechanical screws are optionally provided as one of a ball-nut screw jack, a redundant ball-path screw jack and a screw jack including an acme thread. When the lift mechanisms are provided as electromechanical screws, each lift mechanism 130a, 130b is coupled to a not illustrated power transfer shaft of a motor 132a, 132b, respectively, which motors are coupled one-to the other via a drive-shaft 134. The drive-shaft 134 ensures that both motors 132a, 132b turn at a same speed, such that both sides of the telescopic tunnel section 110 are raised and lowered at a same rate. Preferably, the motors 132a, 132b are reversible electric motors including a break mechanism for substantially preventing extension of a corresponding one of the lift mechanisms 130a, 130b absent a control signal.

Figure 2:
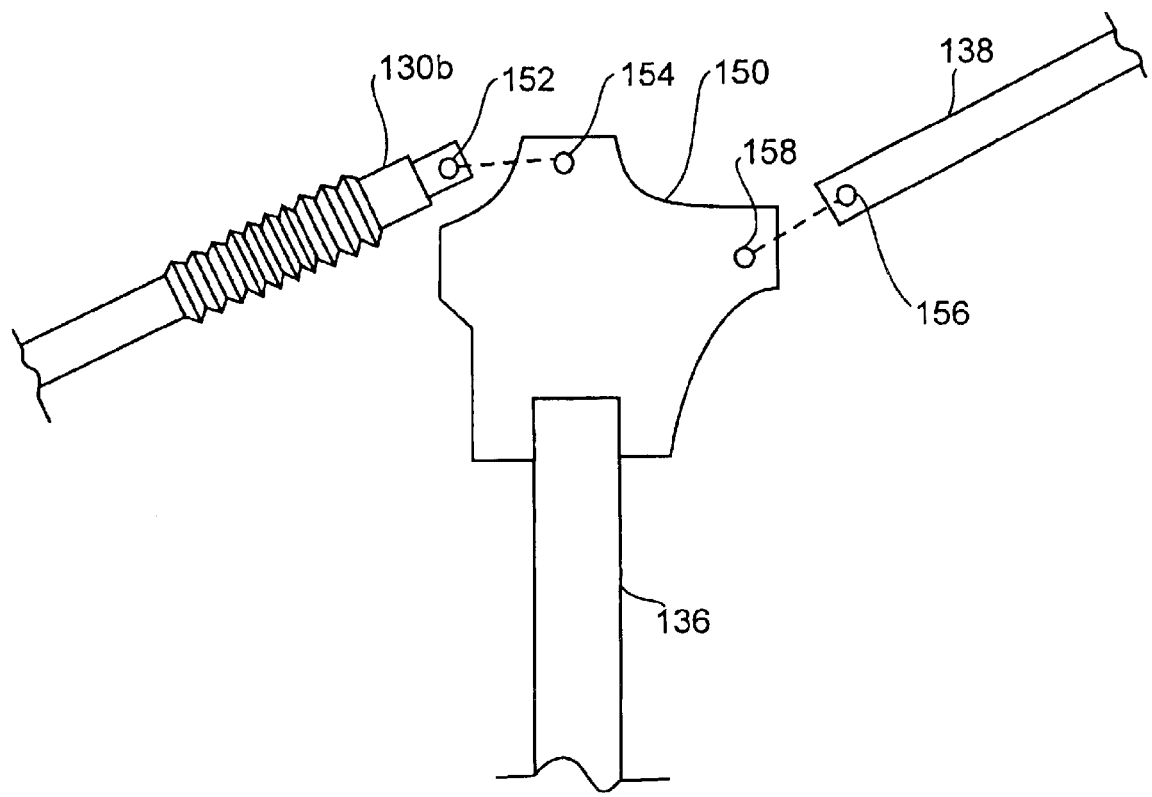
FIG. 2 is a simplified exploded view showing coupling between a mechanism of the overhead adjustable support and two support members.

Referring still to FIG. 1, a first end of each lift mechanism 130a, 130b is coupled to the outer tunnel element 112 via first and second support members 136, 138, respectively. As shown in FIG. 2, the first support member 136 includes a coupling plate 150 that is mounted at a first end of the first support member by known means. For example, the coupling plate 150 is welded to the first support member 136 at the first end thereof. One of the lift mechanisms, for instance the lift mechanism 130b, is hingedly coupled to the coupling plate 150. For instance, the opening 152 at the first end of the lift mechanism 130b is aligned with the opening 154 of the coupling plate 150 to form a passage for receiving a not illustrated pin, so as to form a hinged connection between the coupling plate 150 and the first support member 136. Additionally, an opening 156 at a first end of the second support member 138 and a second opening 158 of the coupling plate 150 are aligned to form a passage for receiving a not illustrated pin, so as to form a hinged connection between the coupling plate 150 and the second support member 138. Similarly, a second end of the lift mechanism 130b is coupled to the first passageway member 108 via third and fourth support members 140, 142, respectively. Of course, the lift mechanism 130a is also coupled to each one of the first passageway member 108 and the outer tunnel element 112 in a manner analogous to that described with reference to the lift mechanism 130b. Preferably, a cross-support member 148 is disposed between, and mounted to at opposite ends thereof, one first support member 136 adjacent to each opposite side of the telescopic tunnel section, so as to maintain a constant separation between first ends of the lift mechanisms 130a, 130b.

Figure 3:
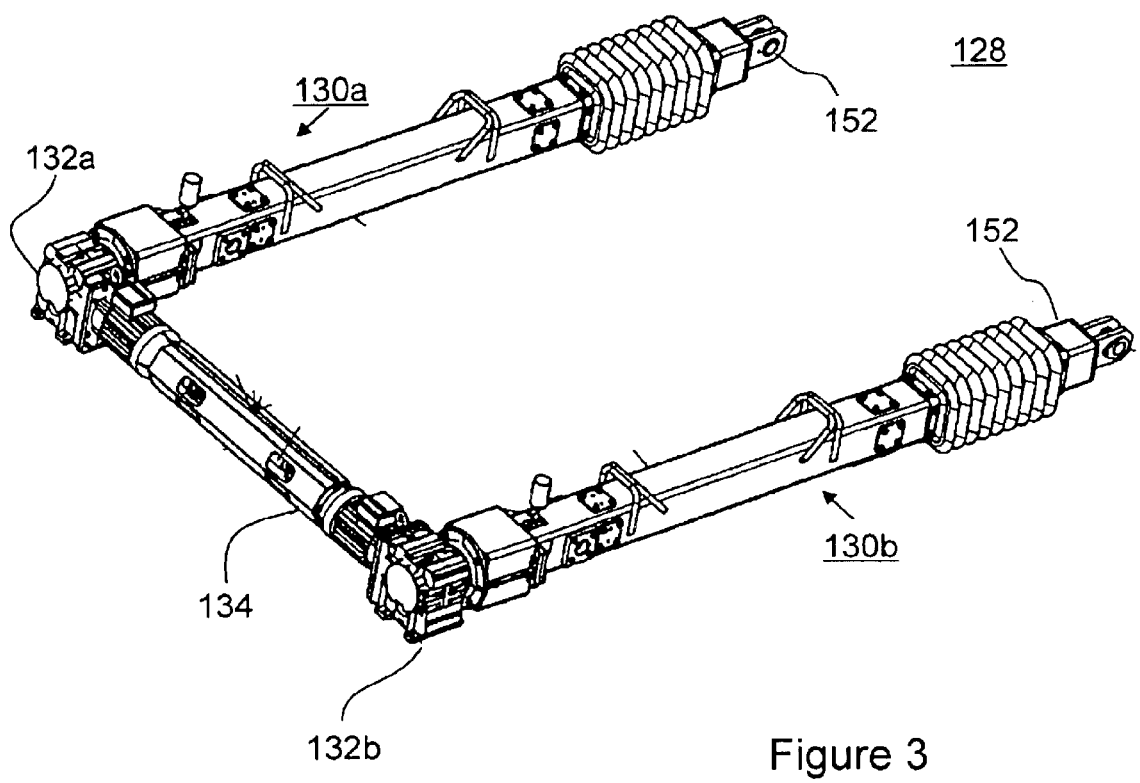
FIG. 3 is a cross-sectional side view of one of the ball-screw jacks of the overhead adjustable support according to the instant invention.

Referring now to FIG. 3, shown is a cross-sectional side view of one of the lift mechanisms of the overhead adjustable support in the form of a ball-screw jack. The ball-screw jack includes an inner suspension tube assembly 160 that is telescopically received within an outer suspension tube assembly 162. A three-inch ball screw 164 is rotatably coupled at a first end thereof to a bearing block 166 that is mounted to an inside surface of the outer suspension tube assembly 162. The three-inch ball screw 164 engages an internal thread of a three-inch ball nut 168 that is secured to a surface of the inner suspension tube assembly 160. Turning the ball screw 164 varies a distance between the bearing block 166 and the ball nut 168, so as to vary a length of the ball-screw jack.

Figure 4:
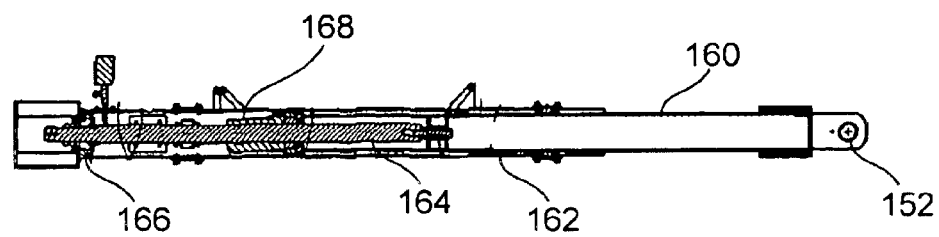
FIG. 4 is partial side elevational view of the overhead adjustable support according to the instant invention.

Referring now to FIG. 4, shown is partial side elevational view of the overhead adjustable support according to the instant invention. The lift mechanisms 130a, 130b are provided as ball-screw jacks in the instant non-limiting example, but of course any of the above-mentioned types of lift mechanism could be provided instead. The ball-screw jacks are shown coupled one each to an output of the motors 132a, 132b. Advantageously, the mechanism for supporting the telescopic tunnel section 110 in a height adjustable manner is lightweight and is of simple construction compared to the prior art mechanisms. It is this lightweight and simple construction that makes it possible to support the mechanism relative to the passenger boarding bridge as shown at FIG. 1. The lift mechanisms 130a, 130b are disposed approximately above and are aligned with the flexible connection 116. Reducing the distance between the first and second ends of the lift mechanisms 130a, 130b reduces the angle that is formed between the first 136 and third 140 support members, thereby elevating the outboard end of the telescopic tunnel section 110 in a controlled fashion. Conversely, increasing the distance between the first and second ends of the lift mechanisms 130a, 130b increases the angle that is formed between the first 136 and third 140 support members, thereby lowering the outboard end of the telescopic tunnel section 110 in a controlled fashion.

As mentioned above, the lift mechanisms 130a, 130b optionally are provided as self-locking mechanisms selected from the group comprising a redundant ball-path screw and an electromechanical screw including an acme thread. Since these mechanisms are inherently self-locking, the probability that the telescopic tunnel section 110 will damage a wing of an aircraft in the event of a failure of the lift mechanisms 130a, 130b is reduced.

Optionally, the lift mechanisms 130a, 130b are provided as a chain drive mechanism, or as any suitable mechanism having a controllably variable length and sufficient mechanical strength to support the weight of the telescopic tunnel section 110.

Advantageously, the overhead adjustable support system according to the instant invention is of sufficiently lightweight construction to permit the passenger boarding bridge to carry the support system. Accordingly, the massive overhead extension arms and permanent support structures that have been described in the prior art are not necessary. This allows the entire passenger boarding bridge to move along an arcuate path about the support 102, providing greater flexibility for moving the passenger boarding bridge toward a doorway of an aircraft. Further advantageously, the first passageway member serves as the counter weight for the telescoping tunnel section, obviating the need for heavy counter weights that are supported overhead as described in some of the prior art solutions.

It is a further advantage of the overhead adjustable support system according to the instant invention that the lift mechanisms 130a, 130b are disposed approximately vertically above the flexible connection 116 when in an assembled condition, as shown in FIG. 1. In particular, the overhead adjustable support system according to the instant invention provides a significant mechanical advantage, in that a small change to the distance between the first and second ends of the lift mechanisms 130a, 130b results in a relatively large vertical swinging motion of the outboard end of the telescopic tunnel section 110. This is shown schematically at FIGS. 5a and 5b. In particular, FIG. 5a shows the overhead adjustable support system when each lift mechanism, in this case lift mechanism 130b, is approximately fully retracted. FIG. 5b shows the lift mechanism 130b extended by a small amount, which is approximately represented by the horizontal arrow above the lift mechanism 130b. The vertical arrow labeled 112 shows a corresponding movement of the outboard end of the outer tunnel element 112, while the vertical arrow labeled 114 shows a corresponding movement of the outboard end of the inner tunnel element 114. Accordingly, the vertical movement at a point along the telescopic tunnel section 110 resulting from a given extension or retraction of the lift mechanism 130b is proportional to a distance between the point and the flexible connection 116. Advantageously, shorter screws may be used with the overhead adjustable support system according to the instant invention compared to another support system that does not provide a similar mechanical advantage.

Optionally a number of lift mechanisms other than two is used to support the telescopic tunnel section in a height adjustable manner. Further optionally, the first, second, third and fourth support members 136, 138, 140 and 142, respectively, are provided as other than separate rod-like members. For instance, the first and second support members are optionally replaced by a unitary support member that attaches to the telescopic tunnel section at two points, one proximate the flexible connection and the other proximate the outboard end of the outer tunnel element 112. Of course, the unitary support member also includes a structure for coupling to the first end of one of the two lift mechanisms 130a, 130b.

Referring now to FIG. 6a, shown is an optional mechanical stop 200 that is pivotally mounted at one end to the third support member 140, and that has a slot 202 for slidingly engaging a pin 204 that is mounted to the first support member 136. The length of the slot is selected such that, in the event of a catastrophic failure of the lift mechanism 130b, the telescopic tunnel section is able to pivot about the flexible connection 116 only until the pin 204 engages the end of the slot at the free end of the mechanical stop 200. Of course, a second mechanical stop 200 is preferably mounted in an analogous fashion adjacent to an opposite side of the passenger boarding bridge. Furthermore, the mechanical stop 200 is optionally provided in other forms that will be obvious to one of skill in the art. For instance, the mechanical stop is provided as one of a chain and a cable mounted at opposite ends thereof to the first and third support members 136 and 140, respectively.

Figure 7:
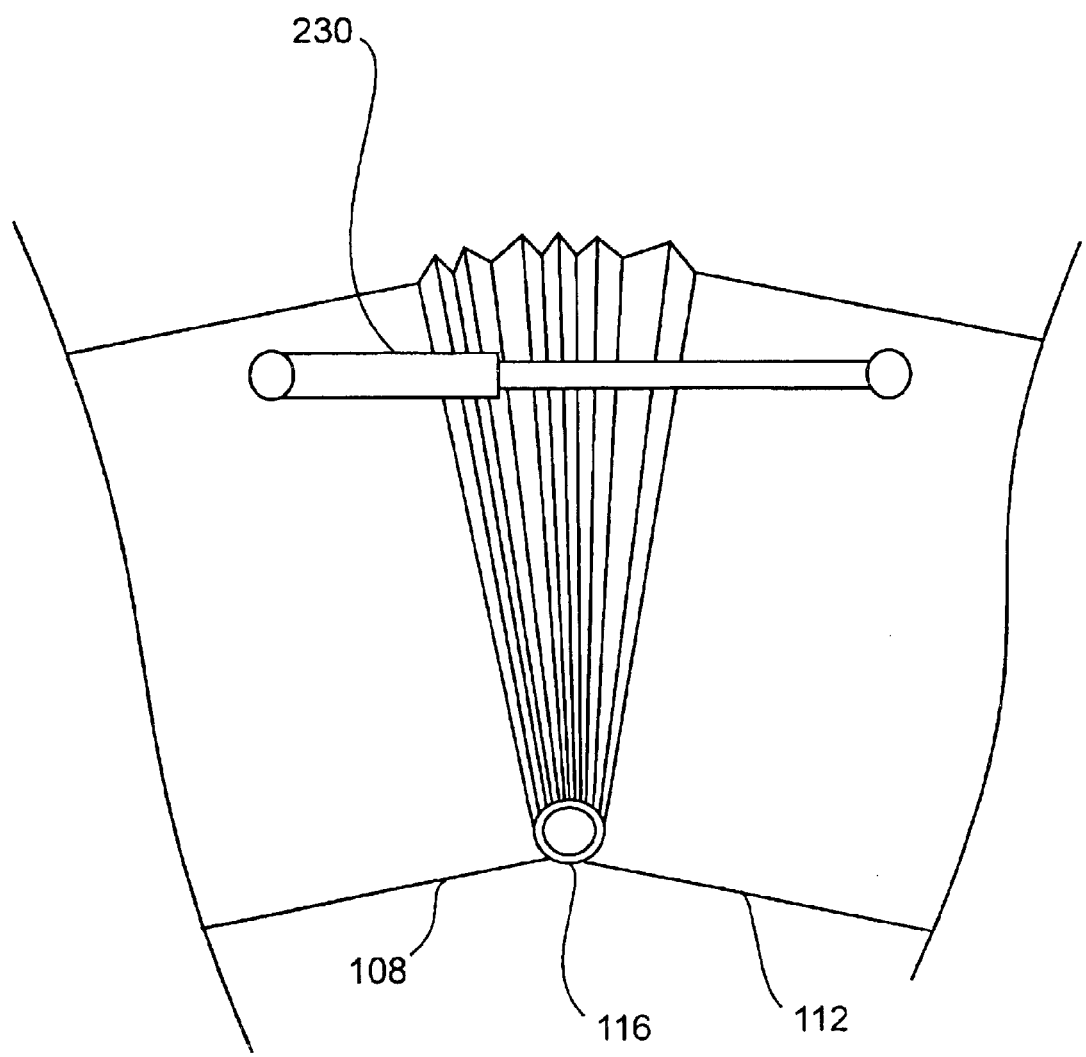

Referring now to FIG. 7, shown is a partial side view of an over-the-wing passenger boarding bridge including another overhead adjustable support according to the instant invention. Elements labeled with the same numerals have the same function as those illustrated in FIG. 1. In particular, the first, second, third, and fourth support members 136, 138, 140, 142 are omitted, and the at least a lift mechanism 230 is mounted directly to a surface of the first passageway member 108 and to a surface of the outer tunnel element 112. Preferably, the at least a lift mechanism 230 includes a first end and a second end that is opposite the first end, a distance between the first end and the second end being controllably variable. The first end of the at least a lift mechanism 230 is in hinged communication with one of the first passageway member 108 and the outer tunnel element 112, proximate an end thereof. Similarly, the second end of the at least a lift mechanism 230 in mechanical communication with the other one of the first passageway member 108 and the outer tunnel element 112 proximate an end thereof. As shown in FIG. 7, the end of the one of the first passageway member 108 and the outer tunnel element 112, and the end of the other one of the first passageway member 108 and the outer tunnel element 112 are disposed in a facing arrangement one each on opposite sides of the flexible floor connection 116 of the passenger boarding bridge. Optionally, the second end of the at least a lift mechanism 230 in hinged communication with the other one of the first passageway member 108 and the outer tunnel element 112 proximate an end thereof.

Preferably, at least two lift mechanisms are provided, one adjacent to each opposite side surface of the passenger boarding bridge. The at least a lift mechanism is selected from a group including: an electromechanical screw; a hydraulic cylinder; and, a pneumatic cylinder. Of course, any other suitable mechanism is also envisaged for use with the instant invention. Preferably, at least two lift mechanisms are provided, one adjacent to each opposite side surface of the passenger boarding bridge.

The passenger boarding bridge 100 shown at FIG. 1 is a specific and non-limiting example of one type of passenger boarding bridge with which the overhead adjustable support system according to the instant invention may be used. Of course, the overhead adjustable support system according to the instant invention is envisaged for use with any type of passenger boarding bridge having two tunnel sections coupled via a flexible connection, such as for instance a hinge.

Numerous other embodiments may be envisaged without departing from the spirit and scope of the invention.

What is claimed is:

1. An overhead adjustable support system for use with an aircraft passenger boarding bridge, the aircraft passenger boarding bridge including at least two tunnel sections disposed one each on opposite sides of a flexible connection, the flexible connection for supporting a vertical swinging motion of one of the at least two tunnel sections relative to the other one of the at least two tunnel sections, the overhead adjustable support system comprising:

a first support member for being mounted to one of the at least two tunnel sections at a first point proximate the flexible connection, and having a free end for being disposed elevationally above the one of the at least two tunnel sections;

a second support member for being mounted to the other one of the at least two tunnel sections at a second point proximate the flexible connection, and having a free end for being disposed elevationally above the other one of the at least two tunnel sections; and, at least a lift mechanism having a first end and a second end opposite the first end, a distance between the first end and the second end being controllably variable, the at least a lift mechanism in hinged communication at the first end thereof with the free end of the first support member and in hinged communication at the second end thereof with the free end of the second support member, whereby varying the distance between the first end and the second end of the at least a lift mechanism effects a change to the orientation of the at least two tunnel sections relative to the flexible connection so as to vertically swing one of the at least two tunnel sections relative to the other one of the at least two tunnel sections about a horizontal axis aligned with the flexible connection.

2. An overhead adjustable support system according to claim 1 wherein the at least a lift mechanism is disposed approximately vertically above the flexible connection of the passenger boarding bridge when in an assembled condition.

3. An overhead adjustable support system according to claim 2 comprising:

a third support member for being mounted to the one of the at least two tunnel sections at a third point distal from the flexible connection and for being in hinged communication with the first end of the at least a lift mechanism; and, a fourth support member for being mounted to the other one of the at least two tunnel sections at a fourth point distal from the flexible connection and for being in hinged communication with the second end of the at least a lift mechanism.

4. An overhead adjustable support system according to claim 2 wherein the first support member is adapted for being mounted to the one of the at least two tunnel sections at the first point proximate the flexible connection and at another point distal from the flexible connection, and wherein the second support member is adapted for being mounted to the other one of the at least two tunnel sections at the second point proximate the flexible connection and at another point distal from the flexible connection.

5. An overhead adjustable support system according to claim 1 wherein the at least a lift mechanism comprises two separate lift mechanisms disposed one each adjacent to and approximately parallel to opposite lateral surfaces of the passenger boarding bridge.

6. An overhead adjustable support system according to claim 5 wherein each one of the two separate lift mechanisms is selected from a group comprising: a hydraulic cylinder; and, a pneumatic cylinder.

7. An overhead adjustable support system according to claim 5 wherein the two separate lift mechanisms comprise a first electromechanical screw and a second electromechanical screw.

8. An overhead adjustable support system according to claim 7 comprising a first reversible electric motor including a first output for being coupled to the first electromechanical screw and a second reversible electric motor including a second output for being coupled to the second electromechanical screw.

9. An overhead adjustable support system according to claim 8 comprising a drive shaft disposed between the first reversible electric motor and the second reversible electric motor for matching a rate of rotation of the first reversible electric motor to a rate of rotation of the second reversible electric motor.

10. An overhead adjustable support system according to claim 7 wherein each one of the first electromechanical screw and the second electromechanical screw is a self-locking electromechanical screw.

11. An overhead adjustable support system according to claim 10 wherein the self-locking electromechanical screw is one of a redundant ball-path screw and an electromechanical screw having an acme thread.

12. An overhead adjustable support system according to claim 7 comprising a mechanical stop disposed between the first support member and the second support member, for arresting a downward swinging motion of one of the at least two tunnel sections in the event of a failure of at least one of the first electromechanical screw and the second electromechanical screw.

13. An overhead adjustable support system for use with an aircraft passenger boarding bridge, the aircraft passenger boarding bridge including at least two tunnel sections disposed one each on opposite sides of a flexible connection, the flexible connection for supporting a vertical swinging motion of one of the at least two tunnel sections relative to the other one of the at least two tunnel sections, the overhead adjustable support system comprising at least a lift mechanism having a first end and a second end that is opposite the first end, a distance between the first end and the second end being controllably variable, the first end of the at least a lift mechanism in hinged communication with one of the two tunnel sections proximate an end thereof and the second end of the at least a lift mechanism in mechanical communication with the other one of the two tunnel sections proximate an end thereof, the end of the one of the two tunnel sections and the end of the other one of the two tunnel sections being disposed in a facing arrangement one each on opposite sides of a flexible floor connection of a passenger boarding bridge.

* * * * *